_United States Patent Office_

3,483,197
Patented Dec. 9, 1969

3,483,197
7-AMINO-CEPHALOSPORANIC ACID DERIVATIVES
Hans Bickel, Binningen, Rolf Bosshardt, Arlesheim, and Bruno Fechtig and Karl Schenker, Binningen, and Jakob Urech, Basel, Switzerland, assignors to Ciba Corporation, New York, N.Y., a corporation of Delaware
No Drawing. Filed Dec. 28, 1965, Ser. No. 517,072
Claims priority, application Switzerland, Jan. 18, 1965, 675/65; Apr. 1, 1965, 4,503/65; May 10, 1965, 6,473/65; Oct. 20, 1965, 14,493/65
Int. Cl. C07d 99/24; A61k 21/00
U.S. Cl. 260—243                14 Claims

ABSTRACT OF THE DISCLOSURE 7-amino-cephalosporanic acids of the formula

I
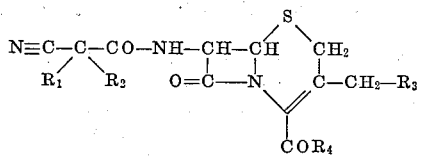

in which $R_1$ and $R_2$ are identical or different and each represents a hydrogen atom or a monovalent hydrocarbon or carbon-bound heterocyclyl radical which may be substituted, or together represent a divalent hydrocarbon radical which may be interrupted by hetero atoms and/or substituted, and in which $R_3$ represents a free hydroxyl group or a hydroxyl group which is esterified with a carboxylic acid and in which ester oxygen atoms may be replaced by sulfur atoms, or a carbamoyloxy group which may be N-substituted and in which oxygen atoms may be replaced by sulfur, or a guanylmercapto or α-iminoalkyl- or -aralkyl mercapto group, a secondary, tertiary or quaternary amino group, a mercapto group etherified, for example, aliphatically, aromatically, or heterocyclically; an azide group or a thiosulfate group, and $R_4$ represents a hydroxyl group, or $R_3+R_4$ together represent the lactone oxygen —O—, and their salts, which may be inner salts, that is to say, compounds in which $R_4$ represents a negatively charged oxygen atom, and $R_3$ contains a positively charged nitrogen atom. The compounds are useful as antibacterial agents.

The present invention relates to the manufacture of new, therapeutically active derivatives of 7-amino-cephalosporanic acid of the formula I
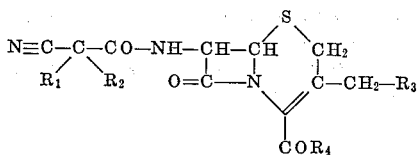

in which $R_1$ and $R_2$ are identical or different and each represents a hydrogen atom or a monovalent hydrocarbon or carbon-bound heterocyclyl radical which may be substituted, or together represent a divalent hydrocarbon radical which may be interrupted by hetero atoms and/or substituted, and in which $R_3$ represents a free hydroxyl group or a hydroxyl group which is esterified with a carboxylic acid and in which ester oxygen atoms may be replaced by sulfur atoms, or a carbamoyloxy group which may be N-substituted and in which oxygen atoms may be replaced by sulfur, or a guanylmercapto or α-iminoalkyl- or -aralkyl mercapto group, a secondary, tertiary or quaternary amino group, a mercapto group etherified, for example, aliphatically, aromatically, or heterocyclically; an azide group or a thiosulfate group, and $R_4$ represents a hydroxyl group, or $R_3+R_4$ together represent the lactone oxygen —O—, and their salts, which may be inner salts, that is to say, compounds in which $R_4$ represents a negatively charged oxygen atom, and $R_3$ contains a positively charged nitrogen atom.

Examples of monovalent hydrocarbon radicals which may be substituted are: lower alkyl radicals with up to 5 carbon atoms, mono- or dicyclic aryl- or aryl-lower alkyl radicals, especially monocyclic radicals, such as optionally substituted phenyl, toluyl, benzyl; optionally substituted monovalent heterocyclyl radicals are for example mono- or dicyclic heterocyclyl radicals or heterocyclyl-lower alkyl radicals, primarily those with 5 to 6 ring members and up to 3 hetero atoms, especially monocyclic heterocyclyl radicals of aromatic character having 5 or 6 ring members and one sulfur, oxygen or nitrogen atom, such as thienyl, furyl, pyridyl, picolyl, pyrryl, or corresponding heterocyclyl-lower alkyl radicals, such as thenyl, furfuryl, pyridyl(2)-methyl.

Substituents of the aforementioned aliphatic hydrocarbon or aromatic, araliphatic, or heterocyclic rings are, for example one or more than one identical or different functional groups, such as hydroxy groups, lower alkoxy or lower alkylmercapto groups, free or esterified carboxy groups, amino groups, nitro groups, cyano or carbonyl groups and especially halogen atoms or trifluoromethyl and in the case of said rings also lower alkyl groups.

Divalent hydrocarbon radicals which may be substituted are for example saturated or unsaturated aliphatic, cycloaliphatic or araliphatic radicals, such as the divalent radicals, linked to oxygen, of corresponding aldehydes, ketones or acid amides, especially divalent saturated or unsaturated aliphatic or cycloaliphatic hydrocarbon radicals which may be interrupted by hetero atoms, such as nitrogen, oxygen and/or sulfur, and/or substituted by functional groups, for example, halogen atoms, nitro or amino groups, for example such as unsubstituted or substituted alkylidene, alkenylidene, cycloalkylidene or cycloalkenylidene radicals, primarily those having 1 to 8, especially 1 to 6 carbon atoms, such as methylene and methylene substituted by one or two lower alkyl or alkenyl radicals, for instance allylidene, ethylidene, α-amino-β-trichlorethylidene, isopropylidene, butylidene, cyclopentylidene, cyclohexylidene; or aryl-substituted divalent saturated or unsaturated aliphatic hydrocarbon radicals, such as phenylalkylidene radicals or phenylalkenylidene radicals in which the aryl radicals may be substituted, for example by one or several lower alkyl, lower alkoxy, nitro or amino groups and/or halogen atoms, especially a benzylidene or cinnamylidene radical which may be substituted as mentioned.

Preferably $R_1$ and $R_2$ represent hydrogen atoms or an alkylidene group having 1 to 6 carbon atoms, as aforesaid, or a benzylidene which may be substituted, especially by halogen atoms, lower alkyl, lower alkoxy, or nitro groups. Furthermore, $R_1$ may represent especially hydrogen and $R_2$ lower alkyl, phenyl, phenyl-lower alkyl or 5- to 6-membered heterocyclyl which may be substituted in the manner indicated above, especially by halogen atoms, lower alkyl, lower alkoxy, or nitro groups.

An esterified hydroxyl group $R_3$ in which the oxygen atoms may be replaced by sulfur is derived primarily from a carboxylic acid and is, for example, a lower alkylcarbonyloxy- or -thiocarbonyloxy group or a lower alkylcarbonylmercapto- or -thiocarbonylmercapto group, for example, a propionyloxy or propionylmercapto group, preferably the acetoxy group or for example a mono- or di-cyclic arylcarbonyloxy- or -thiocarbonyloxy, arylcarbonylmercapto- or -thiocarbonylmercapto group, especially the benzoylmercapto group, which is unsubstituted or substituted for example by lower alkyl, lower alkoxy or lower alkylmercapto radicals, halogen atoms or the nitro group.

Further examples of $R_3$ are:

(a) A carbamoyloxy group of the formula

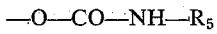

where $R_5$ represents an aliphatic, aromatic, araliphatic or heterocyclic residue, especially a linear or branched unsubstituted lower alkyl radical or one that may be substituted by one or more lower alkoxy groups or halogen atoms, such as the methyl or ethyl or above all the $\beta$-chlorethyl radical; or (b) A thiocarbamoylmercapto group of the formula

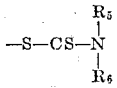

where $R_5$ has the above meaning and $R_6=R_5$ or represents hydrogen; or (c) A guanylmercapto group of the formula

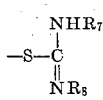

where $R_7$ and $R_8$ each represents hydrogen, a lower alkyl, or a phenyl residue which may be substituted, for example, as indicated above for $R_1$ and $R_2$; or (d) An $\alpha$-iminoalkyl or -aralkylmercapto group of the formula

where $R_9$ is preferably a lower alkyl group or a phenyl or phenyl lower alkyl group which may be substituted, for example as indicated above; or (e) A secondary amino group of the formula

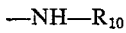

where $R_{10}$ stands for an aromatic or heterocyclic residue, for example an unsubstituted or substituted aryl or pyridyl radical, such as a phenyl or naphthyl group substituted, for example, by halogen, lower alkyl, lower alkoxy, nitro, carboxy, sulphoxy or cyano; or the pyridyl or a lower alkylpyridyl residue, or an acyl radical, e.g. a lower alkanoyl, an aroyl or an arylsulphonyl residue, e.g. acetyl, benzoyl or tolylsulphonyl; or (f) A tertiary amino group of the formula

where $R_{11}$ and $R_{12}$ each stands for lower alkyl, e.g. methyl, and/or aryl radicals such as phenyl or naphthyl residues which may be substituted for example, as indicated above; with special advantage (g) A quaternary amino group in which the quaternary nitrogen atom represents, for example, part of an aromatic ring, such as a quinoline, isoquinoline or pyrimidine ring, or above all of an unsubstituted or substituted pyridine ring, e.g. of the formula

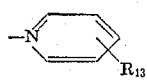

where $R_{13}$ represents hydrogen or one or several lower alkyl, lower alkoxy-carbonyl, carbamoyl or carboxyl groups; or (h) An etherified mercapto group of the formula

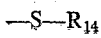

where $R_{14}$ is an aromatic residue, for example a phenyl radical which may be substituted for instance as indicated above, such as phenyl, 2,4-dinitrophenyl, or a heterocyclic residue, more especially a 5- or 6-membered heterocyclic residue, which contains preferably 1 to 3 hetero atoms such as nitrogen, oxygen and/or sulphur, is linked with the sulphur atom of the mercapto group through a carbon atom carrying a double bond, and may carry a benzene residue or lower alkyl groups and/or amino groups, such for example, as a suitable pyridine, quinoline, isoquinoline, $\gamma$-picoline, imidazole, benzimidazole, 2 - amino-6-methyl - benzimidazole, pyrimidine, 2 - aminopyrimidine, 4,5-diamino-pyrimidine, indole, thiazole, 2-aminothiazole, 2-amino-thiadiazole or benzoxazole residue, or an aliphatic residue, e.g. a lower alkyl, lower halogenalkyl or lower aminoalkyl radical, e.g. the $\beta$-aminoethyl radical.

The salts of the new compounds are metal salts, above all those of therapeutically acceptable alkali or alkaline earth metals such as sodium, potassium, calcium or ammonium salts, or salts with organic bases, e.g. triethylamino, N-ethyl-piperidine, dibenzylethylenediamine or procaine. If the group $R_3$ is basic, inner salts may be formed.

The new compounds display a particularly good antibacterial activity. They act against Gram-positive and above all also against Gram-negative bacteria, e.g., against Staphylococcus aureus (pencillin resistant), Escherichia coli, Klebsiella pneumoniae, Salmonella typhosa and Bacterium proteus as shown by animal experiments, for example, in mice. They may thus be used for combating infections caused by such micro-organisms, or as additives for animal feedstuffs, in the perservation of foodstuffs or as disinfectants. Of special value are those compounds in which the acyl radical in position 7 is a cyanacetyl, phenylcyanacetyl, para-chlorophenylcyanacetyl or thienyl(2)-cyanacetyl, radical and $R_3$ represents the acetoxy group, the $\beta$-chlorethylcarbamoyl or a pyridinio group which may be unsubstituted or substituted as indicated above. The toxicity of the new compounds is low; thus, for instance, the $LD_{50}$ of 7-cyanacetylaminocephalosporanic acid in the mouse, intraveneously applied, is 3700 mg./kg., whereas the $ED_{50}$ in the mouse, for instance against Staphylococcus aureus, is 1 mg./kg. (one dosis, s.c. applied directly after the infection of the mice with a letal dosis of Staph. aureus). In human beings the dosis effective against infections by microorganisms is about 500 mg. per day. The compounds can be applied not only parenterally, for instance intraveneously or subcutaneously, but also perorally, especially for instance the 7-(phenylcyanacetylamino)-cephalosporanic acid.

The compounds containing an alkylidene group can also be used as intermediate products in preparing pure compounds having an unsubstituted cyanacetyl radical because the alkylidene group can be hydrolytically split off in an aqueous medium, especially at an elevated temperature and at an alkaline pH.

The new compounds are obtained when a compound of the formula

II

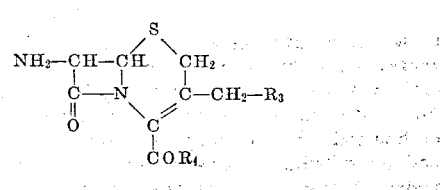

—where $R_3$ and $R_4$ have the same meaning as in Formula I—is acylated in known manner on the 7-amino nitrogen by the group

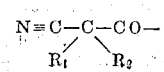

—where $R_1$ and $R_2$ have the same meanings as in Formula I—and, if desired, a resulting compound of the Formula III

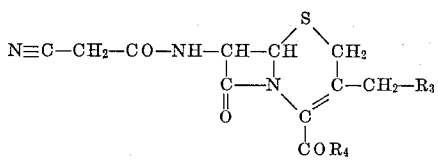

is reacted with an aldehyde, a ketone or a nitrile, suitably in the presence of a catalyst, and, if desired, a resulting compound of the Formula IV

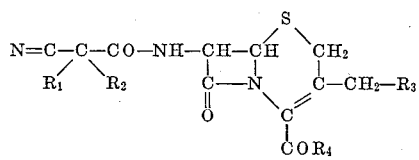

in which $R_1$ and $R_2$ together represent an optionally substituted alkylidene or cycloalkylidene group, is hydrolyzed in an aqueous medium and, if desired, a resulting compound with a free hydroxyl group $R_3$ is converted one having a hydroxyl group $R_3$ esterified with a carboxylic acid, in which oxygen atoms may be replaced by sulfur atoms, or vice versa, and, if desired, in a resulting compound in which $R_3$ represents a hydroxyl group esterified with a carboxylic acid in which oxygen atoms may be replaced by sulfur atoms, this group is replaced in per se conventional manner by an optionally N-substituted carbamoyloxy group which may contain sulfur atoms, instead of oxygen atoms, a guanylmercapto or α-iminoalkyl- or -aralkylmercapto group, a secondary, tertiary or quaternary amino group, a mercapto group etherified, for example, aliphatically, aromatically, or heterocyclically, or by an azide or thiosulfate group, or, if desired, the lactone grouping is formed, and, if desired, a resulting compound is converted into a metal salt, such as an alkali metal or alkaline earth metal salt, or a salt with ammonia or an organic base, or from a resulting salt the free carboxylic acid is formed, or if desired, an inner salt.

The acylation is performed, for example, by means of an acid halide, for example, an acid chloride, or a mixed anhydride, for example, one with a mono-esterified carbonic acid or with pivalic acid or preferably with trichloroacetic acid or with the free acid itself in the presence of a condensing agent, such as a carbodiimide, for example, dicyclohexyl carbodiimide.

Suitable aldehydes, ketones and nitriles are, for example, those of aliphatic nature, such as formaldehyde, acetic aldehyde, acetone, methylethylketone, ethylbutylketone, cyclopentanone, cyclohexanone, cycloheptanone, acetonitrile, trichloracetonitrile or trifluoracetonitrile, or those of araliphatic or aromatic nature having at most two rings which may be substituted as aforesaid, for example, benzaldehyde, para-chlorobenzaldehyde, paranitrobenzaldehyde, cinnamic aldehyde, salicyclic aldehyde, anisaldehyde, vanilline, acetophenone, benzophenone, para-hydroxyacetophenone, phenylacetonitrile, benzonitrile or cinnamic acid nitrile.

Suitable catalysts for the reaction with the carbonyl compounds or nitriles are primarily salts, especially acetates of ammonia or amines, for example, ammonium acetate, amylamine acetate, piperidine acetate, triethylammonium acetate, Dowex 3 (free base and acetic acid salt), also compounds with both acid and basic groups, for example, para-aminophenol. Other suitable catalysts are the salts of compounds of the Formula III in which $COR_4$ represents the carboxyl group with said bases.

Those starting materials are preferred which lead to the aforementioned particularly active end products.

The cephalosporin derivatives used as starting materials can be prepared in per se conventional manner.

The compound of the Formula II, in which $R_3$ represents a hydroxyl group, is advantageously prepared as described in U.S. patent application No. 411,592, filed Nov. 16, 1964 to Jakob Nuesch et al., now Patent No. 3,304,236, and the compound of the Formula II, in which $R_3$ represents a heterocyclic base, especially pyridine, is accessible by the process of British Patent 953,695 to National Research Development Corporation, London, published Mar. 25, 1964.

The replacement of the acetoxy group by a carbamoyloxy group has been described in Belgian Patent 654,039 to CIBA Société Anonyme, published Apr. 6, 1965, and the replacement by a thiocarbamoylmercapto group in Belgian Patent 637,547 to Glaxo Laboratories Ltd., published Mar. 18, 1964. The exchange of the acetoxy group for the further substituents mentioned above can be performed as described in British Patent 912,541 to National Research Development Corporation, London, published Dec. 12, 1962 and in Belgian Patent 617,687 to Glaxo Laboratories Ltd., published Nov. 16, 1962.

The invention includes also any modification of the process in which an intermediate obtained at any stage of the process is used as starting material and any remaining steps are carried out, or the process is discontinued at any stage thereof, or in which a starting material is formed under the reaction conditions or is used in the form of a salt thereof.

The new compounds can be used as medicaments, for example in the form of pharmaceutical preparations containing them in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, chloresterol or other known medicinal excipients. The pharmaceutical preparations may be, for example, tablets, dragees, ointments, creams or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain further therapeutically useful substances. The preparations are formulated by known methods.

The following examples illustrate the invention.

EXAMPLE 1

13.6 g. (0.05 mol) of 7-amino-cephalosporanic acid are taken up in a mixture of 150 ml. of methylene-chloride and 19.5 ml. of tributylamine (0.12 mol) and at 0° C. a solution of 8.4 g. of cyanoacetylchloride (0.07 mol) in 100 ml. of methylene-chloride is stirred in. The bath is then stirred for ½ hour at 0° C. and for ½ hour at 20° C., the reaction solution is evaporated under vacuum and the residue taken up in 10% aqueous di-potassium hydrogenphosphate solution. This aqueous phase is washed with ethyl acetate, acidified to pH=2.0 with concentrated hydrochloric acid and extracted with ethyl acetate. After having been dried over sodium sulphate and evaporated under vacuum, this extract gives as a solid residue 14.7 g. of crude 7-cyanoacetylamino-cephalosporanic acid which is purified by chromatography on 30 times its own weight of silica gel. The fractions eluted with chloroform+acetone (7:3) furnish a product which crystallizes from acetone+ether in the form of needles melting at 168 to 170° C. with decomposition.

The thin-layer chromatogram of the substance on silica gel in the system n-butanol+glacial acetic acid (10:1), saturated with water, shows an Rf value of 0.27, and in the system n-butanol+pyridine+glacial acetic acid+water (30:20:6:24) an Rf value of 0.56. The ultraviolet absorption spectrum in 0.1 N-sodium bicarbonate solution contains a maximum at 260mμ ($\epsilon$=9300). Towards Gram-negative micro-organisms in vitro the action of the substance equals or even surpasses that of cephalothin (direct comparison, Table 1a).

In the dilution test with *Escherichia coli* the substance, in contradistinction to cephalothin, displays at most only a very little dependence on the inoculum size (Table 1).

Its in vivo action is superior to that of cephalothin, as shown in Table 1b where the in vivo action of 7-cyanacetylamino-cephalosporanic acid (I) is compared with that of cephalothin (II) in mice infected with *Staphylococcus aureus* or *Escherichia coli*. 40 mice were used in each experiment. All mice not treated with antibiotic died within a day or two. The figures show the quantities of antibiotic in mg./kg. due to the subcutaneous administration of which 40–50% of the mice survive (test period, 5 days).

TABLE 1

Minimal inhibiting concentration ($\gamma$/ml.) of 7-cyanoacetylaminocephalosporanic acid (I) and cephalothin (II) against *Escherichia coli* (strains 203, 205 and 209) depending on the inoculum size:

|  | I | | | II | | |
|---|---|---|---|---|---|---|
|  | 203 | 205 | 209 | 203 | 205 | 209 |
|  | Inoculum size | | | | | |
| Pure culture | 15 | 15 | 15 | 125 | 125 | 30 |
| Dilution 1:10 | 15 | 15 | 15 | 30 | 60 | 30 |
| Dilution 1:100 | 15 | 8 | 8 | 15 | 15 | 8 |

TABLE 1a

Minimal inhibiting concentration ($\gamma$/ml.) of 7-cyanoacetylamino-cephalosporanic acid (I) and Cephalothin [=7-thienylacetylamino-cephalosporanic acid] against bacteria (Inoculum size=dilution 1:10)

| | Staph. aureus | | Esch. coli | | | Salmonella | | | Klebsiella | | Pseudomoans, | Proteus, |
|---|---|---|---|---|---|---|---|---|---|---|---|---|
| | 14 | 2999 | 203 | 205 | 209 | 271 | 273 | 277 | 327 | 330 | 313 | 253 |
| I | 2 | 2 | 8 | 15 | 8 | 4 | 8 | 30 | 15 | 15 | >500 | 250 |
| II | 0.25 | 0.5 | 15 | 30 | 15 | 4 | 8 | 60 | 15 | 15 | >500 | 500 |

The strain reference numbers signify.—14=*St. aureus* Smith; 2999=*St. aureus* Penicillin G—resistant; 271=*Salm. typhosa*; 273, 271=*Salm. typhimurium*; 327=*Kl. pneumoniae* Type A; 330=*Kl. pneumoniae*; 313=*Pseudomonas aeruginosa*; 253=*Proteus vulgaris*.

TABLE 1b

|  | Staph. aureus (CN 491) | Escherichia coli 205 (=CN 348) |
|---|---|---|
| I (In mg./kg. mouse, s.c.) | 0.25 | 250 |
| II (In mg./kg. mouse, s.c.) | 2 | 1,000 |

EXAMPLE 2

5.10 g. (15 millimols) of 7-cyanoacetyl-aminocephalosporanic acid are suspended in 102 ml. of distilled water and converted into the sodium salt by stirring in dropwise 15 ml. of N-sodium hydroxide solution. The resulting clear solution is stirred with 2.55 g. of cell lyophilisate of *Bacillus subtilis*, ATCC 6633 (for its manufacture see application No. 14,168/63) for 3 hours at room temperature while keeping the pH value constant at 7.3. The acetic acid liberated by the enzymatic hydrolysis is neutralized by adding N-sodium hydroxide solution with the aid of an automatic titrator. (Consumption: 14.6 ml.=97.4% of theory.) When the hydrolysis reaction is complete, 130 ml. of methylenechloride are added, the whole is vigorously agitated and the emulsion is separated on a centrifuge. The supernatant clear aqueous phase contains desacetyl-7-cyanoacetylamino-cephalosporanic acid in the form of its sodium salt in a practically quantitative yield, as revealed by thin-layer chromatographic analysis. To isolate the free acid the aqueous phase is separated, saturated with sodium chloride, cooled to 0° C. and acidified with 40% phosphoric acid to pH=2.1 and once more agitated with ice-cold 1-butanol. The extracts are rapidly evaporated in a rotary evaporator under 0.1 mm. Hg pressure. The desacetyl-7-cyanoacetylamino-cephalosporanic acid is eluted from the dry residue obtained with ethyl acetate and thereby separated from inorganic salts. Table 2 shows the Rf values of desacetyl-7-cyano-acetylamino-cephalosporanic acid (I) and 7-cyanoacetylamino-cephalosporanic acid (II):

TABLE 2

| System | I | II |
|---|---|---|
| n-Butanol+acetic acid (10:1), saturated with water | 0.16 | 0.20 |
| Ethyl acetate+pyridine+acetic acid+water (62:21:6:11) | 0.16 | 0.33 |
| n-Butanol+pyridine+acetic acid+water (38:24:8:30) | 0.61 | 0.65 |

EXAMPLE 3

2 ml. of trifluoroacetic acid are poured over 64 mg. (0.2 millimol) of the sodium salt of desacetyl-7-cyanoacetylamino-cephalosporanic acid, the whole is kept for 10 minutes at 0° C., and the trifluoracetic acid is then expelled under vacuum. The residue is taken up in ethyl acetate, washed with 4% sodium bicarbonate solution and then with 10% sodium chloride solution until the washings run neutral, and the ethyl acetate solution is dried with sodium sulphate and evaporated under vacuum, to furnish the lactone of desacetyl-7-cyanoacetylamino-cephalosporanic acid of the formula

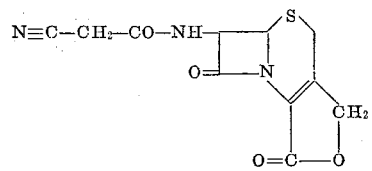

which, after recrystallization from acetone, melts at 223 to 224° C. with decomposition.

The Rf value in the system n-butanol+acetic acid (10:1), saturated with water, is 0.42, and in the system ethyl acetate+pyridine+acetic acid+water (62:21:6:11) it is 0.74.

EXAMPLE 4

14.07 g. of the triethylammonium salt of crude desacetyl-7-cyanoacetylamino-cephalosporanic acid (I) are taken up in 140 ml. of freshly degassed dimethyl formamide, treated with 16 ml. of tributylamine and 108 ml. of a 10% solution of β-chlorethylisocyanate in dimethylformamide, and stirred at 22° C. for 4 hours. The batch is evaporated under a pressure of 0.1 mm. of Hg. The residue is dissloved in 10% aqueous dipotassium-hydrogenphosphate, and extracted by agitation with ethyl acetate. The aqueous phase is given a pH of 2.0 with concentrated hydrochloric acid, saturated with sodium chloride, and extracted with ethyl acetate. The extract is dried over sodium sulfate, and evaporated to give nearly pure O-desacetyl - O - (β - chlorethylcarbamoyl) - 7 - cyanacetylamino-cephalosporanic acid (II) of the formula

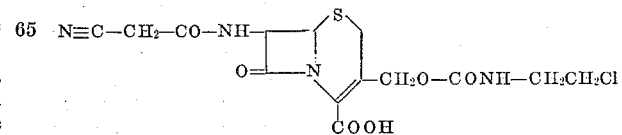

The product is purified by chromatography on silica-gel. The substance that can be eluated with ethyl acetate crystallizes from acetone+ether (1:2); melting point 147–150° C. (decomposition). It has the following properties: UV absorption spectrum in 0.1 N-sodium bicarbonate: $\lambda_{max}260$ mμ ($\epsilon=9200$); thin layer chromatography on silica-gel [system 1:n-butanol+glacial acetic acid (10:1) saturated with water; system 2:n-butanol+pyridine+glacial acetic acid+water (38:20:8:30)]

|  | Rf values | |
|---|---|---|
|  | System 1 | System 2 |
| Starting material (I) | 0.21 | 0.62 |
| Product (II) | 0.39 | 0.72 |

Table 3 shows the minimal inhibiting concentration (γ/ml.) of O-desacetyl-O-(β-chlorethylcarbamoyl)-7-cyanacetylamino-cephalosporanic acid (II) and cephalothin (III) against bacteria (undiluted cultures, 24 hours old).

TABLE 3

|  | Staph. aureus | | Esch. coli | | | Salmonella | | | Kleibsiella | | Pseudomonas, 313 | Proteus, 253 |
|---|---|---|---|---|---|---|---|---|---|---|---|---|
|  | 14 | 2999 | 203 | 205 | 209 | 271 | 273 | 277 | 327 | 330 | | |
| II | <0.25 | 15 | 4 | 8 | 4 | 4 | 15 | 125 | 125 | 8 | 500 | 500 |
| III | <0.06 | 0.5 | 125 | 125 | 30 | 4 | 8 | | 500 | 15 | 500 | 500 |

Table 4 shows the action in vivo of the above compounds II and II in mice infected with Staph. aureus or Esch. coli. The figures show the quantity of the antibiotic in mg./kg. mouse which on subcutaneous application causes 40–50% of the animals to survive. Animals not treated with the antibiotic die within a day or two. Ten mice were used for each test series.

TABLE 4

|  | Staph. aureus CN 491 | Esch. coli CN 348 |
|---|---|---|
| II (In mg./kg. mouse s.c.) | 0.7 | 250 |
| III (In mg./kg. mouse s.c.) | 2 | 1,000 |

EXAMPLE 5

14.1 g. of the triethylammonium salt of crude desacetyl-7-cyanacetylamino-cephalosporanic acid (I) are vibrated for 3 hours in 300 ml. of acetone, then evaporated under vacuum. There is obtained in this manner the triethylammonium salt of O-desacetyl-7-(α-cyano-β-dimethyl-acrylamino)-cephalosporanic acid (II) of the formula

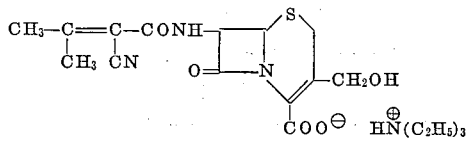

Thin layer chromatogram on silica gel (systems as in Example 4);

|  | System 1 | System 4 |
|---|---|---|
|  | Rf values | |
| Starting material (I) | 0.21 | 0.62 |
| Product (II) | 0.31 | 0.69 |

EXAMPLE 6

14.2 g. of the triethylammonium salt of crude desacetyl-7-(α-cyano-β-dimethyl-acrylamino)-cephalosporanic acid (I) are reacted as described in Example 4 with β-chlorethyl-isocyanate. There is obtained in this manner O - desacetyl - O-(β-chlorethyl-carbamoyl)-7-(α-cyano-β-dimethyl-acrylamino)-cephalosporanic acid (II) of the formula

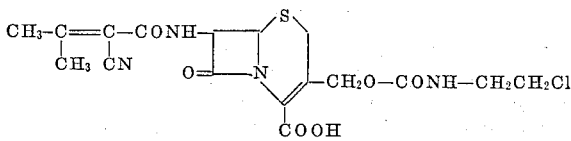

Chromatography on a column of silica gel and elution with chloroform+acetone (9:1) gives the pure substance.

UV absorption spectrum in 0.1 N-sodium bicarbonate: $\lambda_{max}224$ mμ ($\epsilon=17000$). Thin layer chromatogram on silica gel (systems as in Example 4).

|  | System 1 | System 2 |
|---|---|---|
|  | Rf values | |
| Starting material (I) | 0.31 | 0.69 |
| Product (II) | 0.46 | 0.77 |

EXAMPLE 7

5 g. of crystalline 7-cyanacetylamino-cephalosporanic acid (I) and 1 g. of ammonium acetate are vibrated at room temperature for 16 hours in 100 ml. of cyclohexanone. The batch is evaporated under reduced pressure, the residue dissolved in a 10% aqueous dipotassium hydrogen phosphate solution, and the solution washed with ethyl acetate. The aqueous phase is acidified to pH 2.0, saturated with sodium chloride, then extracted with ethyl acetate. Drying of the extract over sodium sulfate and evaporation yields 6.18 g. of crude product which is purified by chromatography over 30 times its quantity of silica gel. The fractions eluated with a 99:1 chloroform: methanol mixture contain the pure 7-(cyclohexylidene-cyanacetylamino)-cephalosporanic acid (II) of the formula

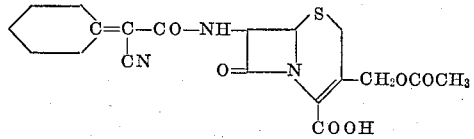

UV absorption spectrum in 0.1 N-sodium bicarbonate solution: $\lambda_{max}230$ mμ ($\epsilon=16900$).

Thin layer chromatogram on silica gel (system as shown in Example 4);

|  | System 1 | System 2 |
|---|---|---|
|  | Rf values | |
| Starting material (I) | 0.25 | 0.56 |
| Product (II) | 0.44 | 0.67 |

EXAMPLE 8

2 g. of O-(desacetyl-β-chlorethylcarbamyol)-7-cyanacetylamino-cephalosporanic acid (I), 400 mg. of ammonium acetate and 40 ml. of cyclohexanone are allowed to react as described in Example 7, then worked up. In the silica chromatogram, the fractions eluted with a 99:1 mixture of chloroform and methanol yield pure O-desacetyl - O - (β-chlorethylcarbamoyl)-7-(cyclohexylidene-cyanacetylamino) - cephalosporanic acid (II) of the formula

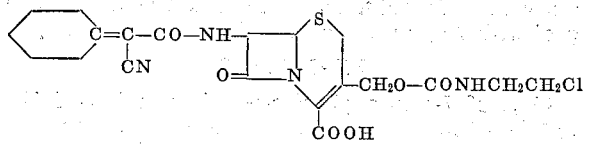

Thin layer chromatogram on silica gel (system as in Example 4);

|  | System 1 | System 2 |
|---|---|---|
|  | Rf values | |
| Starting material (I) | 0.30 | 0.59 |
| Products (II) | 0.47 | 0.65 |

EXAMPLE 9

27.2 g. (0.1 mol) of 7-amino-cephalosporanic acid are dissolved in a mixture of 250 ml. of absolute methylene chloride and 71.5 ml. (0.3 mol) of tributylamine, and the solution treated, with stirring, at 0° C. to −10° C. in the course of half an hour with a solution of 14.7 g. (0.125 mol) of α-cyanopropionyl chloride in 100 ml. of methylene chloride. When the addition is complete, the batch is stirred for half an hour at 0° C. and for an hour at 20° C., then evaporated under a pressure of 0.1 mm. of Hg. The residue is dissolved in a 10% aqueous dipotassium hydrogen phosphate solution and washed with ethyl acetate. The aqueous phase is extracted with ethyl acetate at a pH of 2.0. The crude extract is chromatographed on silica gel, and the product eluted with an 8:2 mixture of chloroform and acetone. Crystallization from acetone+ether yields pure 7-(α-cyanopropionylamino)-cephalosporanic acid melting at 160–164° C. (with decomposition).

UV absorption spectrum in 0.1 N-sodium bicarbonate solution: $\lambda_{max}260$ m$\mu$ ($\epsilon$=9300).

EXAMPLE 10

34.8 g. (102.5 millimols) of 7-cyanacetylamino-cephalosporanic acid are converted into the sodium salt as in Example 2, and desacetylated with 17.4 g. of cell-lyophilisate of *Bacillus subtilis* ATCC 6633. The resulting aqueous suspension, about 860 ml., is treated with 800 ml. of methylene chloride, the whole stirred thoroughly, and the resulting emulsion separated by centrifuging. The methylene chloride phase and the cell cake are discarded. The supernatant aqueous solution, which in addition to sodium acetate and water-soluble constituents of the cell-lyophilisate contains the sodium salt of desacetyl-7-cyanacetyl-amino-cephalosporanic acid, is concentrated under reduced pressure to 250 ml.

A column of 2.05 liters of Dowex 50–WX8 ion exchange resin (H+ form) is converted into the triethylammonium form by percolating with 7.7 liters of triethylammonium acetate buffer, pH 5.7 (0.5 molar with reference to acetic acid), then washed with 3 liters of water. The above 250 ml. of concentrate are allowed to percolate slowly through the column and then washed with water. The first 2 liters of eluate contain the hydroscopic triethylammonium salt of desacetyl-7-cyanacetylamino - cephalosporanic acid. Lyophilization yields 49 g. of a residue. The UV resorption spectrum in water shows a maximum at 262 m$\mu$, $\epsilon$=5950.

EXAMPLE 11

A solution of 62.6 g. (0.73 mol) of cyanacetic acid and 185 ml. (0.76 mol) of tributylamine in 600 ml. of absolute methylene chloride is treated at −10° C. while stirring with 865 ml. of a 10% solution of pivalyl chloride (0.72 mol) in methylene chloride. The reaction is allowed to proceed for half an hour in the cold. The reaction mixture is then slowly stirred into an ice-cold solution of 150 g. (0.55 mol) of 7-amino-cephalosporanic acid and 393 ml. (1.6 mols) of tributylamine in 2 liters of methylene chloride. After stirring for half an hour at 0° C., the batch is evaporated under reduced pressure and worked up in a manner analogous to that of Example 1 to obtain 163.0 g. of crude 7-cyanacetylamino-cephalosporanic acid.

EXAMPLE 12

15 g. of 7-cyanacetylamino-cephalosporanic acid (I) and 3 g. of anhydrous ammonium acetate are dissolved in a mixture of 300 ml. of acetone and 200 ml. of dimethyl formamide, and the solution allowed to stand for 16 hours at 240° C. It is then evaporated under reduced pressure, the residue dissolved in 10% dipotassium hydrogen phosphate, and the solution washed with ethyl acetate. The aqueous phase is extracted at pH 2.0 in the cold with ethyl acetate, and the extract dried and evaporated. The crude product (15.4 g.) is purified by chromatography on the 30- fold quantity of silica gel. A 98:2 mixture of chloroform and acetone eluates the pure 7-(α-cyano-β-dimethylacrylamino)-cephalosporanic acid (II).

Thin-layer chromatography on silica gel (systems as shown in Example 4):

|  | System I | System II |
| --- | --- | --- |
|  | Rf values | |
| Starting material (I) | 0.24 | 0.53 |
| Product (II) | 0.33 | 0.61 |

EXAMPLE 13

100 mg. of 7-cyanacetylamino-cephalosporanic acid and 20 mg. of anhydrous ammonium acetate are dissolved in 2 ml. of a mixture of 1 part by volume of dimethylformamide and 1 part by volume of 2-octanone, and the solution vibrated for 16 hours at 22° C. The solution is then taken up in a 10% aqueous dipotassium hydrogen phosphate solution, washed with ethyl acetate, the pH adjusted to 2.0, and the solution extracted with ethyl acetate. The extract is dried over sodium sulfate and evaporated. The residue consists of 7-[octylidene-(2)-cyanacetyl-amino]-cephalosporanic acid. In system 1 (cf. Example 4), the compound has an Rf value of 0.58. In the same system, 7-cyanacetylamino-cephalosporanic acid has the Rf value 0.28.

EXAMPLE 14

In a manner analogous to that of Example 13 and with the use of 3-heptanone instead of 2-octanone there is obtained 7-[heptylidene(3)-cyanacetylamino]-cephalosporanic acid which in System I has the Rf value 0.56 (cf. Example 4).

EXAMPLE 15

When in the process of Example 13 para-chlorobenzaldehyde is used as carbonyl compound, 7 - (para - chlorobenzylidene-cyanacetylamino)-cephalosporanic acid is obtained; Rf=0.49 (system I, Example 4).

EXAMPLE 16

When in the process of Example 13 the carbonyl compound used is para-nitrobenzaldehyde, 7-(para-nitrobenzylidene-cyanacetylamino-cephalosporanic acid of Rf=0.45

(system 1, Example 4) is obtained.

EXAMPLE 17

When in the process according to Example 13, 7-cyanacetylamino-cephalosporanic acid is reacted with cinnamic aldehyde, 7-(phenylallylidene-cyanacetylamino)-cephalosporanic acid is obtained which has the Rf value 0.47 (system 1, Example 4).

EXAMPLE 18

The reaction of 7-cyanacetylamino-cephalosporanic acid with acetaldehyde by the process according to Example 13 yield 7-(ethylidine-cyanacetylamino)-cephalosporanic acid; Rf=0.36 in system 1 (Example 4).

EXAMPLE 19

When 7-cyanacetylamino-cephalosporanic acid is reacted with trichloroacetonitrile by the process described in Example 13, 7-[(α-amino-β-trichloroethylidine)-cyanacetylamino]-cephalosporanic acid is obtained which has the Rf value 0.48 in the system 1 (Example 4).

EXAMPLE 20

9.46 g. of the sodium salt of 7-(cyclohexylidene-cyanacetylamino) - cephalosporanic acid are dissolved in 80 ml. of a mixture of 16.2 ml. of 40% aqueous sodium thiobenzoate solution, 4.8 g. of potassium dihydrogen phosphate and 90 ml. of water, and the pH adjusted to 4.5 with 80% phosphoric acid. The batch is heated at 90° C. for 15 minutes, then diluted with 500 ml. of 10% dipotassium hydrogen phosphate solution, and extracted with ethyl acetate. The extract is evaporated, the residue dissolved in 0.1 molar phosphate buffer (pH 7.0) and washed with ether. The aqueous phase is extracted at pH 2.0 with ethyl acetate. There is obtained in this manner 3 - (desacetoxymethyl) - 3 - benzoyl - thiomethyl - 7- (cyclohexylidene - cyanacetylamino) - cephalosporanic acid of the formula

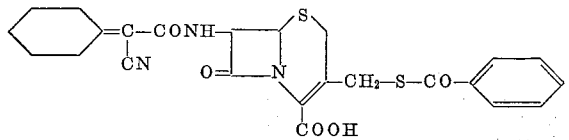

Thin layer chromatogram on silica gel (systems as in Example 4);

|  | System 1 | System 2 |
| --- | --- | --- |
|  | Rf values |  |
| Starting material (I) | 0.43 | 0.63 |
| Product (II) | 0.68 | 0.68 |

EXAMPLE 21

514 mg. (1 mmol) of 3 - (desacetoxymethyl) - 3 - benzoyl - thiomethyl - 7 - (cyclohexylidene - cyanacetylamino)-cephalosporanic acid (I) are dissolved in 5 ml. of pyridine and 9 ml. of an aqueous solution of 1.2 g. of mercury - II - perchlorate (3 mmols), and the solution heated at 35° C. for half an hour. The batch is then evaporated, the residue dissolved in 20 ml. of water, and hydrogen sulfide passed through the solution for 20 minutes, 1 g. of potassium acetate is then added, the batch filtered, and the filtrate evaporated under reduced pressure. The residue (1.84 g.) is chromatographed on the 30-fold quantity of silica gel. The fractions eluted with a mixture of methanol and water (95:5) contain 3-(desacetoxymethyl) - 3 - pyridiniomethyl - 7 - (cyclohexylidene - cyanacetylamino) - cephalosporanic acid (II) of the formula

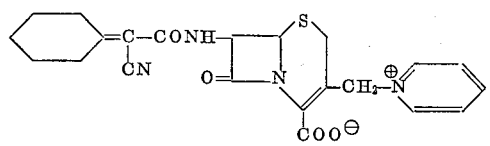

Thin layer chromatography on silica gel (systems as in Example 4);

|  | System 1 | System 2 |
| --- | --- | --- |
|  | Rf values |  |
| Starting material (I) | 0.65 | 0.82 |
| Product (II) | 0.13 | 0.55 |

EXAMPLE 22

27.2 g. (0.1 mol) of 7-amino-cephalosporanic acid (I) are dissolved in a mixture of 250 ml. of absolute methylene chloride, and 71.5 ml. (0.3 mol) of tributylamine, and the solution treated, while stirring at —10° C., with a solution of 14.7 g. (0.125 mol) of α-cyano-propionyl chloride in 120 ml. of methylene chloride. The mixture is stirred for half an hour at —10° C. and for one hour at 22° C. The batch is evaporated under a pressure of 0.1 mm. Hg, the residue dissolved in 500 ml. of 10% aqueous dipotassium hydrogen phosphate solution, and washed with ethyl acetate. The aqueous phases are extracted with ethyl acetate at pH 2.0. Drying the extract over sodium sulfate and evaporation under reduced pressure yield 19.18 g. of crude 7-(β-cyanopropionamido)-cephalosporanic acid (II). The product is purified by chromatography over the 30-fold quantity of silica gel. It is eluted with an 8:2 mixture of chloroform and acetone, and then crystallizes from acetone+ether. Melting point 160–164° C. (with decomposition). UV absorption spectrum in 0.1 N sodium bicarbonate solution shows an absorption maximum at 260 mμ (ε=9500). Thin layer chromatography on silica gel (system as in Example 4):

|  | System 1 | System 2 |
| --- | --- | --- |
|  | Rf values |  |
| Starting material (I) | 0.08 | 0.43 |
| Product (II) | 0.27 | 0.56 |

EXAMPLE 23

8.1 g. (30 mmols) of 7-amino-cephalosporanic acid (I) are dissolved in a mixture of 150 ml. of absolute methylene chloride and 22 ml. (90 mmols) of tributylamine, and the solution acylated, while stirring at —10° C., with a solution of 5.4 g. (30 mmols) of phenylcyanacetyl chloride in 30 ml. of methylene chloride as described in Example 22, then worked up. The crude product is chromatographed on the 3-fold quantity of silica gel. The pure 7 - phenyl - cyanacetylamino - cephalosporanic acid (II) is eluted with a 98:2 mixture of chloroform and acetone. Thin-layer chromatogram on silica gel (systems as in Example 4):

|  | System 1 | System 2 |
| --- | --- | --- |
|  | Rf values |  |
| Starting material (I) | 0 09 | 0.42 |
| Product (II) | 0.48 | 0.80 |

EXAMPLE 24

100 mg. of 7-cyclohexylidene-cyanacetylamino-cephalosporanic acid are dissolved in 3 ml. of a 1:4-mixture of pyridine and water, and the solution hydrolyzed for 16 hours at 37° C. The batch is evaporated under reduced pressure to obtain 75 mg. of 7-cyanacetylamino-cephalosporanic acid.

EXAMPLE 25

A 0.5% solution of O - desacetyl - O - (β - chlorethylcarbamoyl) - 7 - (α - cyano - β - dimethyl - acrylamino)-cephalosporanic acid in 0.1 molar phosphate buffer pH 7 is heated at 37° C. for 16 hours. O-desacetyl-O-(β-chlorethyl - carbamoyl) - 7 - cyanacetylamino - cephalosporanic acid is obtained which has an Rf value of 0.31 in system 1 (Example 4). In the same system the starting material has the Rf value 0.40.

EXAMPLE 26

75 g. of cyanacetic acid and 112 ml. of triethylamine are dissolved in 500 ml. of tetrahydrofuran and at about —40° C. treated with 272 ml. of a 50% solution of trichloracetyl chloride in tetrahydrofuran. The reaction mixture is allowed to react in the cold for 20 minutes, and a solution of 109 g. of 7-amino-cephalosporanic acid and 196 ml. of triethylamine in 1.6 litres of methylene chloride is then added at —40° C. The batch is stirred for 45 minutes at —20° C. and then poured on to neutral phosphate buffer. The organic solvents are removed in vacuo and the remaining aqueous phase is washed with ethyl acetate. The aqueous phase is finally extracted at pH 2.0 with ethyl acetate and the resulting extract dried with sodium sulphate and evaporated. The crude residue is chromatographed as described in Example 1 and the pure product crystallized. 7 - cyanacetamido - cephalosporanic acid is obtained in almost quantitative yield.

EXAMPLE 27

By a method analogous to that of Example 26, the mixed anhydride is prepared from 3.7 g. of thienylcyanacetic acid, 3.4 g. of trichloracetyl chloride and 2.8 ml. of triethylamine in 25 ml. of tetrahydrofuran, and allowed to react with a solution of 2.7 g. of 7-amino-cephalosporanic acid and 3.5 ml. of triethylamine in 50 ml. of methylene chloride. Working up by an analogous method to that of Example 26 yields 7-thienyl-(2)-cyan-acetylamino-cephalosporanic acid of the formula

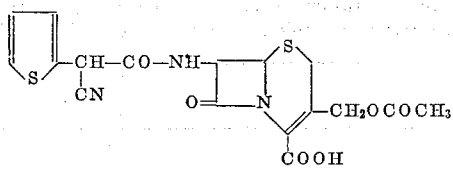

EXAMPLE 28

When according to Example 27, 2.7 g. of 7-aminocephalosporanic acid (in 50 ml. of methylene chloride and 3.5 ml. of triethylamine) are acylated with the anhydride from 4.0 g. of para-chlorophenyl-cyanacetic acid, 3.4 g. of trichloracetyl chloride and 2.8 ml. of triethylamine (in 25 ml. of tetrahydrofuran) and the batch is worked up, there is obtained nearly unitary 7-(para-chlorophenyl-cyanacetylamino)-cephalosporanic acid of the formula

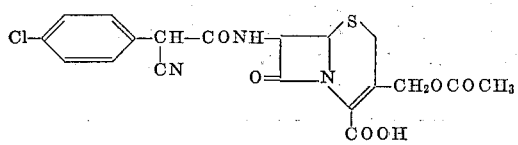

EXAMPLE 29

A solution of 2 g. crystalline 7-($\beta$-cyanpropionylamino)-cephalosporanic acid (I) in 60 ml. pyridine-water (1:4) is heated for 16 hours to 45° C. and then evaporated under reduced pressure. The residue is chromatographed on silica gel. From the latter the starting material is removed with acetone and then 7-($\alpha$-cyanpropionylamino)-3-desacetoxymethyl - 3 - pyridiniomethyl-cephalosporanic acid (II) is eluted with methanol-water (9:1). Thin-layer chromatogram on silica gel (systems as in Example 4) gives the following Rf-values:

| Rf values | System 1 | System 2 |
|---|---|---|
| Starting material (I) | 0.31 | 0.61 |
| Product (II) | 0.02 | 0.20 |

What is claimed is:
1. Compounds as claimed are selected from the group consisting of a compound of Formula I

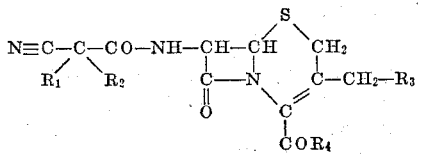

in which $R_1$ represents hydrogen, $R_2$ represents a member selected from the group consisting of hydrogen, lower alkyl, unsubstituted and substituted phenyl, unsubstituted and substituted phenyl-lower alkyl and unsubstituted and substituted 5- to 6-membered aromatic heterocyclyl, the substituents of said radicals being selected from the group consisting of halogen, lower alkyl, lower alkoxy, amino and nitro and the hetero atoms being selected from the group consisting of nitrogen, sulfur and oxygen, $R_3$ represents a member selected from the group consisting of acetoxy, N-substituted carbamoyloxy, the substituents being selected from the group consisting of lower alkyl and halogeno-lower alkyl, an unsubstituted and substituted phenylcarbonyloxy and phenylcarbonylthio group and an unsubstituted and substituted pyridinium group, the substituents being selected from the group consisting of lower alkyl, lower alkoxy-carbonyl, carbamoyl and carboxy groups, and $R_4$ represents the hydroxy group or, in the case where $R_3$ is a pyridinium group, a negatively charged oxygen atom, and therapeutically acceptable alkali metal, alkaline earth metal and salts thereof with organic acids.

2. Compounds as claimed in claim 1 which compounds are selected from the group consisting of a compound of Formula I

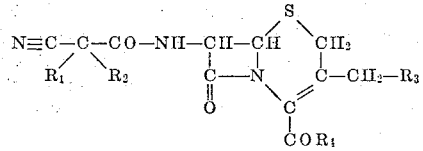

in which $R_1$ represents hydrogen, $R_2$ represents a member selected from the group consisting of hydrogen, lower alkyl, unsubstituted and substituted phenyl, unsubstituted and substituted phenyl-lower alkyl and unsubstituted and substituted 5- to 6-membered heterocyclyl of aromatic character, the substituents of said radicals being selected from the group consisting of halogen, lower alkyl, lower alkoxy, amino and nitro, $R_3$ represents a member selected from the group consisting of acetoxy, N-substituted carbamoyloxy, the substituents being selected from the group consisting of lower alkyl and halogeno-lower alkyl, an unsubstituted and substituted phenylcarbonyloxy and phenylcarbonylthio group and an unsubstituted and substituted pyridinio group, the substituents being selected from the group consisting of lower alkyl, lower alkoxycarbonyl, carbamoyl and carboxy groups, and $R_4$ represents the hydroxy group or, in the case where $R_3$ is a pyridinio group, a negatively charged oxygen atom, and salts thereof.

3. Compounds as claimed in claim 1 which compounds are selected from the group consisting of a compound of Formula I

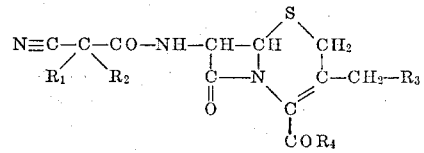

in which $R_1$ and $R_2$ together represent a member selected from the group consisting of unsubstituted and substituted alkylidene, alkenylidene, cycloalkylidene and cycloalkenylidene having 3 to 6 carbon atoms in said divalent hydrocarbon radical, the substituents being selected from the group consisting of halogen atoms, the amino group, nitro group, the phenyl group, a lower alkyl-phenyl, lower alkoxy-phenyl, nitro-phenyl and halogeno-phenyl group, and in which $R_3$ represents a member selected from the group consisting of acetoxy, N-substituted carbamoyloxy, the substituents being selected from the group consisting of lower alkyl and halogeno-lower alkyl, an unsubstituted and substituted phenylcarbonyloxy and phenylcarbonylthio group and an unsubstituted and substituted pyridinium group, the substituents being selected from the group consisting of lower alkyl, lower alkoxy-carbonyl, carbamoyl and carboxy groups, and $R_4$ represents the hydroxy group or, in the case where $R_3$ is a pyridinium group, a negatively charged oxygen atom, and salts thereof.

4. Compounds as claimed in claim 1 which compounds are selected from the group consisting of a compound of Formula I

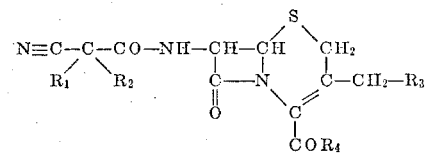

in which $R_1$ represents hydrogen, $R_2$ represents a member selected from the group consisting of hydrogen, lower alkyl having 1–4 carbon atoms, phenyl, phenyl substituted by one or more members selected from the group consisting of halogen atoms, lower alkyl, lower alkoxy groups, and the nitro group, and the thienyl group, R₃ represents a member selected from the group consisting of the acetoxy group, the benzoyl-thio group, a carbamoyl group substituted by a chlorine-substituted lower alkyl group and the pyridinio group and R₄ represents the hydroxy group or, in the case of the pyridinium group, a negatively charged oxygen atom, and salts thereof.

5. Compounds as claimed in claim 1 which compounds are selected from the group consisting of a compound of Formula I

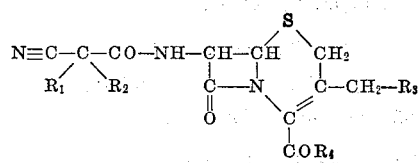

in which R₁ and R₂ together represent a member selected from the group consisting of methylene substituted by one or two members selected from the group consisting of unsubstituted and substituted lower alkyl and lower alkenyl groups having at most four carbon atoms, the substituents being selected from the group consisting of halogen atoms, nitro and amino group, and an unsubstituted and substituted phenyl and styryl group, the substituents being selected from the group consisting of lower alkyl, lower alkoxy, nitro and amino groups and halogen atoms, R₃ represents a member selected from the group consisting of the acetoxy group, the benzoyl—thio group, a carbamoyl group substituted by a chlorine-substituted lower alkyl group and the pyridinio group and R₄ represents the hydroxy group or, in the case of the pyridinium group, a negatively charged oxygen atom, and salts thereof.

6. Compounds as claimed in claim 1, which compounds are selected from the group consisting of a compound of Formula I

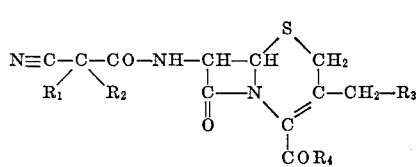

in which R₁ and R₂ each stands for hydrogen, R₃ represents a member selected from the group consisting of acetoxy, β-chlorethyl-carbamoyl and the pyridinium group and R₄ stands for the hydroxy group or, in the case where R₃ is the pyridinio radical, for a negatively charged oxygen atom, and therapeutically acceptable salts thereof.

7. Compounds as claimed in claim 1, which compounds are selected from the group consisting of a compound of Formula I

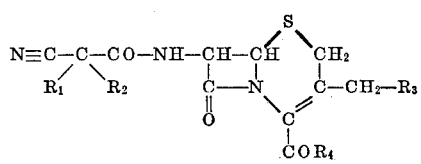

in which R₁ stands for hydrogen, R₂ for a member selected from the group consisting of phenyl and para-chlorphenyl and thienyl(2), R₃ represents a member selected from the group consisting of acetoxy, β-chlorethyl-carbamoyl and the pyridinio group and R₄ stands for the hydroxy group or, in the case where R₃ is the pyridinium radical, for a negatively charged oxygen atom, and therapeutically acceptable salts thereof.

8. Compounds as claimed in claim 1, which compounds are selected from the group consisting of a compound of Formula I

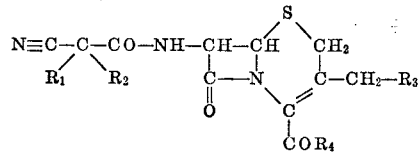

in which R₁ and R₂ together stand for a member selected from the group consisting of ethylidene, isopropylidene, α-amino-β-trichlorethylidene and cyclohexylidene, R₃ represents a member selected from the group consisting of acetoxy, β-chlorethyl-carbamoyl and the pyridinium group and R₄ stands for the hydroxy group or, in the case where R₃ is the pyridinio radical, for a negatively charged oxygen atom, therapeutically acceptable and salts thereof.

9. A compound as claimed in claim 1, which compound is selected from the group consisting of a compound of Formula I

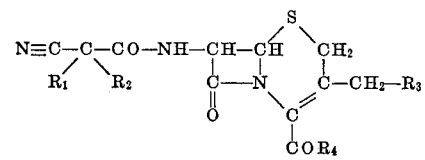

in which R₁ and R₂ each stands for hydrogen, R₃ represents the acetoxy group and R₄ the hydroxy group, therapeutically acceptable and salts thereof.

10. A compound as claimed in claim 1, which compound is selected from the group consisting of a compound of Formula I

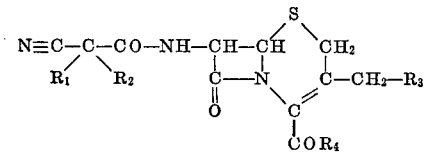

in which R₁ and R₂ each stands for hydrogen, R₃ represents the β-chlorethylcarbamoyl group and R₄ the hydroxy group, and therapeutically acceptable salts thereof.

11. A compound as claimed in claim 1, which compound is selected from the group consisting of a compound of Formula I

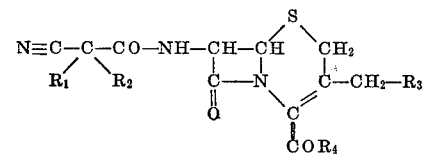

in which R₁ stands for hydrogen, R₂ for phenyl, R₃ for the acetoxy group and R₄ for the hydroxy group, and therapeutically acceptable salts thereof.

12. A compound as claimed in claim 1, which compound is selected from the group consisting of a compound of Formula I

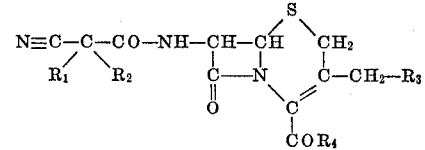

in which $R_1$ stands for hydrogen, $R_2$ for thienyl (2), $R_3$ for the acetoxy group and $R_4$ for the hydroxy group, and therapeutically acceptable salts thereof.

13. A compound as claimed in claim 1, which compound is selected from the group consisting of a compound of Formula I

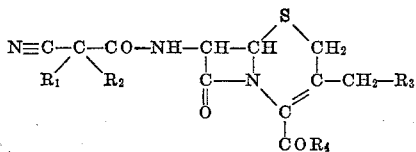

in which $R_1$ and $R_2$ together stand for the isopropylidene group, $R_3$ represents the β-chlorethylcarbamoyl group and $R_4$ the hydroxy group, and therapeutically acceptable salts thereof.

14. A compound as claimed in claim 1, which compound has the formula

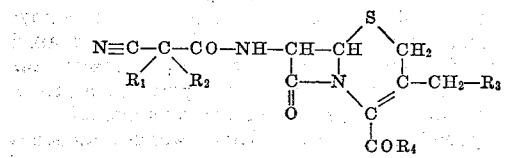

in which $R_1$ and $R_2$ together stand for the cyclohexylidene group, $R_3$ represents the pyridinium radical and $R_4$ a negatively charged oxygen atom.

References Cited
UNITED STATES PATENTS
3,222,362   12/1965   Flynn _____ 260—243

NICHOLAS S. RIZZO, Primary Examiner

U.S. Cl. X.R.
424—246; 99—2

CASE 5613/1-4/E

PO-1050
(5/69)

UNITED STATES PATENT OFFICE
CERTIFICATE OF CORRECTION

Patent No. 3,483,197   Dated December 9, 1969

Inventor(s) HANS BICKEL ET AL

It is certified that error appears in the above-identified patent and that said Letters Patent are hereby corrected as shown below:

Column 15, lines 45-75, should read:

"A member selected from the group consisting of a compound of the formula I

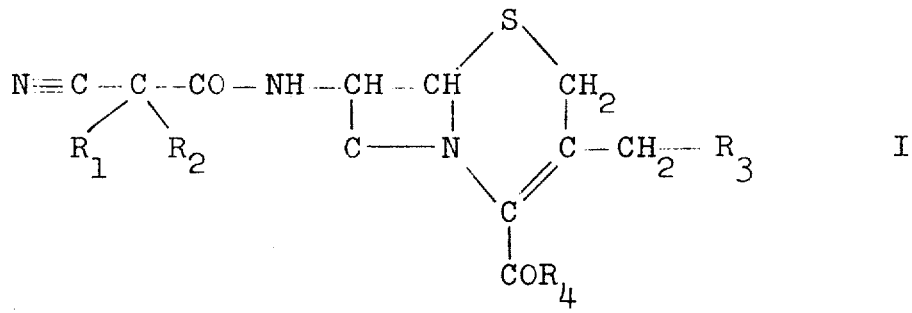

in which $R_1$ and $R_2$ each represent a member selected from the group consisting of hydrogen, lower alkyl, lower alkyl substituted by a member selected from the group consisting of halogen, trifluoromethyl, nitro and amino, phenyl, naphthyl, phenyl-lower alkyl, naphthyl-lower alkyl and each of said substituents in which the carbocyclic portion is substituted by a member selected from the group consisting of halogen, trifluoromethyl, nitro, amino and lower alkyl, monocyclic heterocyclic aryl, and monocyclic heterocyclic aryl substituted by a member selected from the group consisting of halogen, trifluoromethyl, nitro, amino and lower alkyl, each of said heterocyclic aryl groups having 1 to 3 ring hetero atoms selected from the group consisting of nitrogen, sulfur and oxygen and $R_1$ and $R_2$ taken together represent

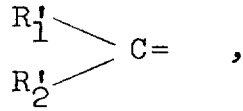

CASE 5613/1-4/E

PO-1050
(5/69)

UNITED STATES PATENT OFFICE
CERTIFICATE OF CORRECTION

Patent No. 3,483,197    Dated December 9, 1969

Inventor(s) HANS BICKEL ET AL

It is certified that error appears in the above-identified patent and that said Letters Patent are hereby corrected as shown below:

in which $R_1'$ and $R_2'$ have the same meanings as $R_1$ and $R_2$, respectively, or, taken together represent a member selected from the group consisting of lower alkylene or lower alkenylene, and in which $R_3$ represents a member selected from the group consisting of hydroxy, lower alkyl-carbonyloxy, lower alkyl-thiocarbonyloxy, lower alkyl-carbonylmercapto, lower alkyl-thiocarbonylmercapto, unsubstituted and substituted monocyclic arylcarbonyloxy, unsubstituted and substituted monocyclic arylthiocarbonyloxy, unsubstituted and substituted monocyclic arylcarbonylmercapto, unsubstituted and substituted monocyclic arylthiocarbonylmercapto, the substituents being lower alkyl, lower alkoxy, lower alkyl-mercapto, halogen or nitro, an N-substituted carbamoyloxy group of the formula $-X-CX-NH-R_5$, in which $R_5$ is a member selected from the group consisting of lower alkyl, lower alkoxy-lower alkyl and halo-lower alkyl and X is a member selected from the group consisting of oxygen and sulfur, guanyl-mercapto, N—lower alkylated guanyl-mercapto, α-imino-lower alkyl-mercapto, α-imino-phenyl-lower alkyl-mercapto, and a pyridimium group and in which $R_4$ represents a hydroxy group or $R_3$ and $R_4$ together represent the lactone oxygen -O-, and its therapeutically acceptable alkali metal, alkaline earth metal and salts with organic acids.

Column 16, lines 10-29, should read:

"in which $R_1$ represents hydrogen, $R_2$ represents a member selected from the group consisting of hydrogen, lower alkyl, unsubstituted and substituted phenyl, unsubstituted and substituted phenyl-lower alkyl and unsubstituted and substituted 5- to 6-membered aromatic heterocyclyl, the substituents of said radicals being selected from the group consisting of halogen, lower alkyl, lower alkoxy, amino and nitro and

CASE 5613/1-4/E

PO-1050
(5/69)

UNITED STATES PATENT OFFICE
CERTIFICATE OF CORRECTION

Patent No. 3,483,197                    Dated December 9, 1969

Inventor(s) HANS BICKEL ET AL

It is certified that error appears in the above-identified patent and that said Letters Patent are hereby corrected as shown below:

the hetero atoms being selected from the group consisting of nitorgen, sulfur and oxygen, $R_3$ represents a member selected from the group consisting of acetoxy, N-substituted carbamoyloxy, the substituents being selected from the group consisting of lower alkyl and halogeno-lower alkyl, an unsubstituted and substituted phenylcarbonyloxy and phenylcarbonylthio group and an unsubstituted and substituted pyridinium group, the substituents being selected from the group consisting of lower alkyl, lower alkoxy-carbonyl, carbamoyl and carboxy groups, and $R_4$ represents the hydroxy group or, in the case where $R_3$ is a pyridinium group, a negatively charged oxygen atom, and therapeutically acceptable alkali metal, alkaline earth metal and salts thereof with organic acids."

Signed and sealed this 12th day of October, 1971.

(SEAL)
Attest:

EDWARD M. FLETCHER, JR.          ROBERT GOTTSCHALK
Attesting Officer                Acting Commissioner of Patents